United States Patent
Legg et al.

(10) Patent No.: US 10,986,629 B2
(45) Date of Patent: Apr. 20, 2021

(54) APPARATUS AND METHOD FOR SCHEDULING COMMUNICATIONS IN A WIRELESS COMMUNICATION SYSTEM

(71) Applicant: Blu Wireless Technology Limited, Bristol (GB)

(72) Inventors: Peter Jonathon Legg, Bristol (GB); Stuart Ryan, Bristol (GB)

(73) Assignee: Blu Wireless Technology Limited, Bristol (GB)

( * ) Notice: Subject to any disclaimer, the term of this patent is extended or adjusted under 35 U.S.C. 154(b) by 0 days.

(21) Appl. No.: 16/349,383

(22) PCT Filed: Nov. 14, 2017

(86) PCT No.: PCT/EP2017/079203
§ 371 (c)(1),
(2) Date: May 13, 2019

(87) PCT Pub. No.: WO2018/091466
PCT Pub. Date: May 24, 2018

(65) Prior Publication Data
US 2019/0335455 A1    Oct. 31, 2019

(30) Foreign Application Priority Data
Nov. 18, 2016    (GB) ..................................... 1619557

(51) Int. Cl.
*H04W 72/04*    (2009.01)
*H04W 28/02*    (2009.01)
(Continued)

(52) U.S. Cl.
CPC ... *H04W 72/0446* (2013.01); *H04W 28/0205* (2013.01); *H04W 72/121* (2013.01); *H04W 84/12* (2013.01)

(58) Field of Classification Search
CPC ........... H04W 72/0446; H04W 72/121; H04W 28/0205; H04W 84/12; H04W 72/1252; H04W 84/20
See application file for complete search history.

(56) References Cited

U.S. PATENT DOCUMENTS 5,347,511 A * 9/1994 Gun .................... H04L 12/5602
370/255
9,160,673 B1 * 10/2015 Lang ...................... H04L 47/29
(Continued)

FOREIGN PATENT DOCUMENTS

WO    2011025426 A1    3/2011
WO    WO-2011025426 A1 *  3/2011    ........ H04W 72/1252

*Primary Examiner* — Jay P Patel
(74) *Attorney, Agent, or Firm* — Optimus Patents US, LLC

(57) ABSTRACT

An apparatus schedules communications in a wireless communication system comprising a plurality of wireless stations (103-107) operable to communicate wirelessly with each other in accordance with a time division multiple access scheme. The apparatus comprises a receiver (303) for receiving resource requests from the plurality of wireless stations (103-107). A scheduler (305) schedules air interface resource to communications between the plurality wireless stations by allocating time intervals in repeating scheduling intervals. A transmitter (301) transmits scheduling messages providing indications of the scheduling to the plurality of wireless stations (103-107). An adapter (307) adapts a duration of at least one scheduling interval of the repeating scheduling intervals in response to the resource requests from the plurality of wireless stations (103-107).

18 Claims, 8 Drawing Sheets

(51) Int. Cl.
*H04W 72/12* (2009.01)
*H04W 84/12* (2009.01)

(56) References Cited

U.S. PATENT DOCUMENTS

| | | | | |
|---|---|---|---|---|
| 10,098,122 | B2* | 10/2018 | Wang | H04L 47/30 |
| 10,412,591 | B2* | 9/2019 | Su | H04B 1/3816 |
| 10,631,277 | B2* | 4/2020 | Le | H04W 72/0406 |
| 2004/0196850 | A1 | 10/2004 | Ho | |
| 2007/0025383 | A1* | 2/2007 | Katar | H04B 7/2643 |
| | | | | 370/442 |
| 2007/0025391 | A1* | 2/2007 | Yonge, III | H04B 3/54 |
| | | | | 370/458 |
| 2009/0215462 | A1* | 8/2009 | Lundh | H04L 47/10 |
| | | | | 455/445 |
| 2010/0195552 | A1* | 8/2010 | Ho | H04W 72/0413 |
| | | | | 370/311 |
| 2012/0122465 | A1* | 5/2012 | Landstrom | H04W 72/1252 |
| | | | | 455/450 |
| 2012/0188957 | A1* | 7/2012 | Lundh | H04W 28/14 |
| | | | | 370/329 |
| 2012/0213142 | A1* | 8/2012 | Van Lieshout | H04W 72/121 |
| | | | | 370/312 |
| 2013/0242833 | A1* | 9/2013 | Ahn | H04W 76/28 |
| | | | | 370/311 |
| 2013/0301609 | A1* | 11/2013 | Smith | H04W 16/14 |
| | | | | 370/331 |
| 2014/0056220 | A1* | 2/2014 | Poitau | H04W 76/14 |
| | | | | 370/328 |
| 2014/0247795 | A1* | 9/2014 | Kim | H04W 72/042 |
| | | | | 370/329 |
| 2015/0282148 | A1* | 10/2015 | Le | H04W 72/0406 |
| | | | | 370/329 |
| 2016/0029403 | A1* | 1/2016 | Roy | H04W 28/0278 |
| | | | | 370/336 |
| 2016/0191409 | A1* | 6/2016 | Li | H04W 72/0406 |
| | | | | 709/226 |
| 2017/0048775 | A1* | 2/2017 | Kim | H04W 76/18 |
| 2017/0290028 | A1* | 10/2017 | Lee | H04W 72/14 |
| 2017/0325119 | A1* | 11/2017 | Lee | H04W 4/029 |
| 2018/0027548 | A1* | 1/2018 | Suzuki | H04W 74/0833 |
| | | | | 370/329 |
| 2018/0083743 | A1* | 3/2018 | Chen | H04L 1/1854 |
| 2018/0131421 | A1* | 5/2018 | Chen | H04B 7/0695 |
| 2019/0208463 | A1* | 7/2019 | Lou | H04L 5/0032 |
| 2019/0349782 | A1* | 11/2019 | Kim | H04W 74/006 |
| 2020/0059950 | A1* | 2/2020 | Oteri | H04W 72/1289 |
| 2020/0067577 | A1* | 2/2020 | Lou | H04W 74/002 |

* cited by examiner

APPARATUS AND METHOD FOR SCHEDULING COMMUNICATIONS IN A WIRELESS COMMUNICATION SYSTEM

FIELD OF THE INVENTION

The invention relates to scheduling communications in a wireless communication system and in particular, but not exclusively an IEEE 802.11 wireless communication system.

BACKGROUND OF THE INVENTION

Wireless communication has become ubiquitous and forms the basis of many applications and services provided to the consumer of today. A particularly widespread set of wireless communication systems, colloquially known as has been developed by the Wi-Fi Alliance® and is standardized in the Institute of Electrical and Electronics Engineers' (IEEE®) 802.11 standards. Wi-Fi® wireless communication systems are typically used to implement Wireless Local Area Networks (WLANs) in many different environments, such as in homes, workplaces, or public areas.

Wu-Fi® systems provide many functions, features and services suitable for efficient implementation of WLANs and data communication. The IEEE® 802.11 standards have been, and are being, developed to provide an increasing number of functions, services and benefits. The initial versions of the IEEE® 802.11 standards were based on radio communication in the 2.4 GHz band, but this has been enhanced to also include the 5.0 GHz band. One variant is known as IEEE® 802.11ad and this further expands the standard to support communications in the 60 GHz band.

The IEEE® 802.11 standards support a number of use scenarios and a number of different configurations. Typically, a Wi-Fi® based WLAN includes one or more wireless Access Points (APs) which are typically connected to each other and/or the Internet by a wired connection (such as an Ethernet connection). Each AP wirelessly serves a number of remote terminals known as stations (STAs). Data communications to and from the individual STA is accordingly directly with the serving AP, and two STAs communicating with each other will do so via the supporting AP (or supporting APs in case they are not supported by the same AP). This mode of operation is known as the infrastructure mode and a single AP together with all supported STAs is denoted a Basic Service Set (BSS).

IEEE® 802.11 standards further support a configuration with an Independent BSS (IBSS) in order to enable a peer-to-peer ad-hoc network of STAs without any associated central AP. In this case, the STAs may communicate directly with each other but as there is no AP providing access to the wired network, it is not possible to communicate with STAs that are not part of the IBSS. There is also typically no access to e.g. the Internet or other wired network elements (e.g. printers or network attached storage).

A new network architecture in IEEE® 802.11ad is based on the formation of a Personal BSS (PBSS). The architecture is based on an ad-hoc network similar to the IBSS approach but implements a more centralized control by one of the STAs in a PBSS taking on the role of being a PBSS Control Point (PCP). The PCP provides a basic timing for communications and provides a broadcast signal which includes a beacon providing timing information and control information. In addition, the PCP is responsible for allocating air interface to the STAs of the PBSS. The PCP thus provides many of the functions of an AP in infrastructure mode.

The IEEE® 802.11 standards, and specifically the PBSS architecture, is based on a Time Division Multiple Access (TDMA) approach in which a given carrier is divided into distinct time intervals that are allocated to the individual STAs (a plurality of carriers are supported and thus the approach uses both TDMA and FDMA). For PBSS, the PCP schedules the air interface by allocating time intervals to the STAs of the PBSS. Time intervals may either be Contention-Based Access Periods (CBAPs) in which a plurality of STAs may potentially seek to use the carrier, and Service Periods (SPs) which are time intervals allocated to a single communication between two STAs of the PBSS (including potentially between the PCP and another STA).

A very critical technical challenge and performance parameter is that of how to most efficiently utilize the available air interface resource. The air interface resource is allocated by a scheduler performing a scheduling routine to allocate resource within the individual BSS. For a PBSS, the scheduling is performed by the PCP and this subsequently communicates the allocations to the STAs of the PBSS.

However, despite the scheduling performance being one of the most important performance criteria of many wireless communication systems, such as IEEE® 802.11 based wireless communication systems, conventional scheduling approaches for TDMA systems tend to be suboptimal, and in particular tend to result in a suboptimal resource utilisation and/or suboptimal performance characteristics (such as increased delays or throughput). In particular, conventional TDMA systems tend to struggle efficiently handling bursty traffic, such as e.g. bursty Internet traffic.

Hence, an improved approach for scheduling communications in a wireless communication system would be advantageous. In particular, an approach that allows improved operation, improved scheduling, increased flexibility, facilitated implementation, facilitated operation, improved resource utilisation, reduced delay, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for scheduling communications in a wireless communication system comprising a plurality of wireless stations operable to communicate wirelessly with each other in accordance with a time division multiple access scheme, the apparatus comprising: a receiver for receiving resource requests from the plurality of wireless stations; a scheduler for scheduling air interface resource to communications between the plurality wireless stations by allocating time intervals in repeating scheduling intervals; a transmitter for transmitting scheduling messages providing indications of the scheduling to the plurality of wireless stations; and an adapter for adapting a duration of at least one scheduling interval of the repeating scheduling intervals in response to the resource requests from the plurality of wireless stations, the adapter being arranged to increase the duration for the resource requests being indicative of a higher combined resource being requested by the wireless stations.

The invention may provide improved scheduling and/or performance in many wireless communication systems. It may in many embodiments provide an improved trade-off between efficiency and/or delay/latency. The approach may facilitate implementation in many embodiments and may allow efficient utilisation of the available air interface resource while still allowing low complexity control and management of the system.

The approach may in particular in many embodiments provide an efficient support of bursty traffic, such as bursty Internet traffic.

The approach may be particularly advantageous and suitable for IEEE® 802.11 systems. In particular, it may provide very advantageous performance for an 802.11ad system, including in particular for a PBSS (Personal Basic Service Set) of such a system.

The time intervals being allocated may specifically be SPs (Service Periods) of an IEEE® 802.11 BSS (Basic Service Set). The plurality of wireless stations may form a BSS of an IEEE® 802.11 communication system.

The plurality of wireless communication stations may be operable to communicate wirelessly with each other by being able to establish direct communication links between them without any intervening central station. Specifically, for an IEEE® 802.11 system, the wireless stations may be able to communicate directly without going through a central station such as an AP (Access Point). As the system employs a TDMA (Time Division Multiple Access) scheme, all communications between the wireless stations may be using the same frequency.

A scheduling interval may be an interval between two subsequent scheduling messages (potentially including one of these). A scheduling message may provide scheduling data for a communication time interval between the scheduling message and the following scheduling message. The time intervals being allocated may be time intervals of the communication time interval. The time intervals may be allocated to communication links between pairs of the plurality of wireless stations. A scheduling interval may correspond to a frame of a TDMA frame used by the TDMA scheme.

The resource requests may be indicative of an amount of resource being requested and the duration may be adapted in response to a combined resource request from the plurality of wireless stations. A resource request may be indicative of an amount of data pending scheduling on a communication link between a pair of wireless stations. Accordingly, the resource requests may be indicative of data pending communication (or scheduling) on communication links between pairs of wireless stations. The adapter may be arranged to determine the total amount of pending data and the duration may be adapted in response to this total amount of pending data.

A resource request may specifically be a transmission time (interval) request.

The wireless stations are wireless communication stations (i.e. communication stations that can communicate wirelessly).

The adapter is arranged to increase the duration for the resource requests being indicative of a higher combined resource being requested by the wireless stations.

In accordance with an optional feature of the invention, the scheduler is arranged to determine an indication of a total amount of data pending scheduling in response to the resource requests, and the adapter is arranged to adapt the duration in response to the total amount of pending data.

In accordance with an optional feature of the invention, the scheduler is arranged to: determine a set of priorities including a priority for each link for a set of communication links between pairs of the plurality of wireless stations, the priority of a link being determined in response to a current estimated data rate for the link relative to an averaged previous achieved data rate for the link; and schedule air interface resource to the plurality of wireless stations in response to the set of priorities.

In accordance with an optional feature of the invention, the scheduler is arranged to further determine the priority for a link of a set of communication links between pairs of the plurality of wireless stations (103-107) in response to at least one of: a traffic class or category for the link; a traffic identifier for the link; a traffic stream for the link; and an identity of at least one wireless station of the link.

The plurality of wireless communication stations may form a Basic Service Set, BSS, of an IEEE® 802.11 wireless local area network.

The plurality of wireless communication stations may form a Personal Basic Service Set, PBSS, of an IEEE® 802.11 ad wireless local area network.

In accordance with an optional feature of the invention, the adapter is arranged to adapt the duration in response to at least one of a requirement that the duration does not exceed a maximum duration threshold and a requirement that the duration does not fall below a minimum duration threshold.

In accordance with an optional feature of the invention, the transmitter is arranged to transmit beacon messages with repeating beacon time intervals, the transmit beacon messages comprising system control information.

The system control information may specifically comprise at least one of: an identity of a controlling wireless station; a time frame reference; a frame structure definition or description; a duration indication for different fields of a time frame; a cell identification (for a wireless cellular communication system); a BSS (Basic Service Set) identity (for an IEEE® 802.11 wireless communication system).

In accordance with an optional feature of the invention, the repeating beacon time intervals and the scheduling intervals have the same timings.

In accordance with an optional feature of the invention, the repeating beacon time intervals and the scheduling intervals have different timings.

In accordance with an optional feature of the invention, the transmitter is arranged to transmit the beacon messages periodically in non-periodic scheduling intervals.

In accordance with an optional feature of the invention, the transmitter is arranged to transmit scheduling messages in all scheduling intervals and beacon messages in only a subset of the scheduling intervals.

In accordance with an optional feature of the invention, the transmitter is arranged to transmit indications of a timing of a subsequent scheduling message to the wireless stations.

According to an aspect of the invention there is provided a method of scheduling communications in a wireless communication system comprising a plurality of wireless stations operable to communicate wirelessly with each other in accordance with a time division multiple access scheme, the method comprising: receiving resource requests from the plurality of wireless stations; scheduling air interface resource to communications between the plurality of wireless stations by allocating time intervals in repeating scheduling intervals; transmitting scheduling messages providing indications of the scheduling to the plurality of wireless stations; and adapting a duration of at least one scheduling interval of the repeating scheduling intervals in response to the resource requests from the plurality of wireless stations, the adapting comprising increasing the duration for the resource requests being indicative of a higher combined resource being requested by the wireless stations.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
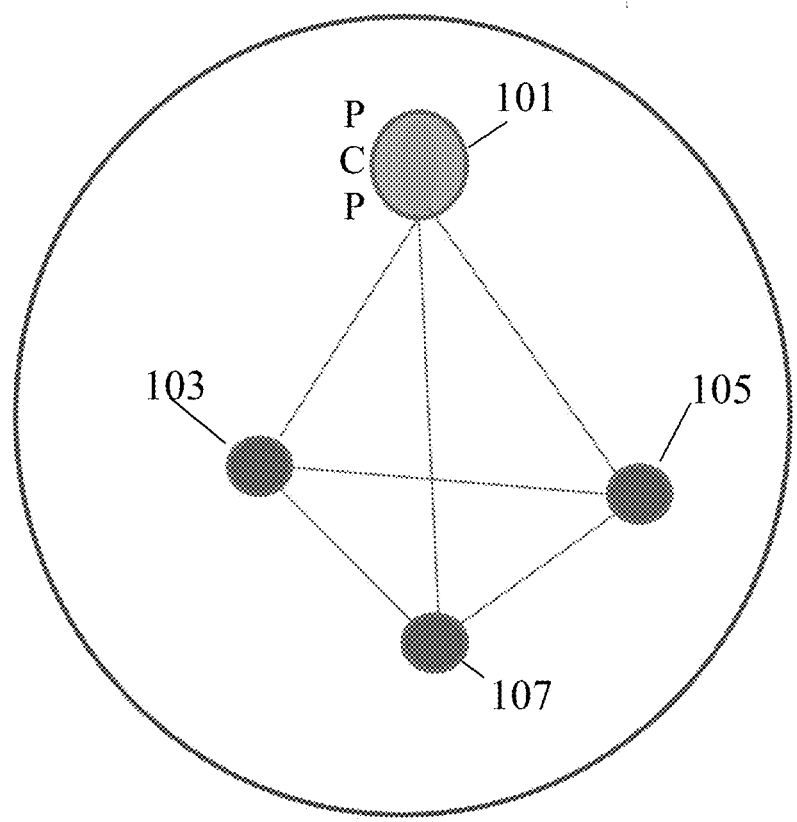
FIG. 1 illustrates an example of elements of a wireless communication system.

FIG. 1 illustrates an example of elements of a wireless communication system. The specific example illustrates a BSS of four wireless stations/wireless communication units which are specifically Wi-Fi® communication units operating in accordance with the IEEE® 802.11 standards. In the example, the four communication units are IEEE® 802.11 stations (STAs) 101, 107 and the BSS is a Personal BSS (PBSS).

In the PBSS, a first STA is designated as a PBSS Control Point PCP 101 with the remaining STAs 103-107 operating under the control of the PCP 101. A PCP may specifically perform many of the functions that are typically performed by the AP (Access Point) in an Infrastructure BSS (IBSS). As such, the PCP may perform functions such as allocating radio resource within the BSS, broadcasting a timing signal to which the BSS operation is synchronised, broadcasting the scheduling information etc.

However, in contrast to a conventional IBSS, the PCP is not a dedicated communication unit or a permanent base station, access point or indeed PCP. Rather, a PCP corresponds to a STA configured to perform the functions of a PCP 101 in the PBSS. The approach allows for PBSSs to form ad-networks.

Further, in a PBSS, communications may be directly between non PCP STAs without this communication being through the PCP. Thus, direct STA to STA is supported. However, the communication is still under the control of the PCP and the PCP is responsible for the allocation of air interface resource to the communication.

Although transmissions/communications may be directly between two STAs, this will be managed by the PCP and accordingly all STAs in a PBSS must be able to communicate with the PCP (including receiving broadcast information from this). It is however not a requirement that a given STA must be able to communicate with any other STAs than the PCP.

The PBSS of FIG. 1 may specifically operate in accordance with the IEEE® 802.11ad approach.

IEEE® 802.11 communication systems use Time Division Multiple Access (TDMA) and Time Division Duplex (TDD) to share the air interface resource. In the PBSS of FIG. 1, the PCP 101 may accordingly allocate air interface resource by allocating time intervals to individual communications.

The TDMA/TDD approach is enabled by the PCP establishing a repeating time frame for the air interface communications. In conventional systems, the PCP broadcasts repeating beacon messages establishing a beacon interval and the other STAs in the PBSS synchronise their communications to the time frame of the beacon.

Figure 2:
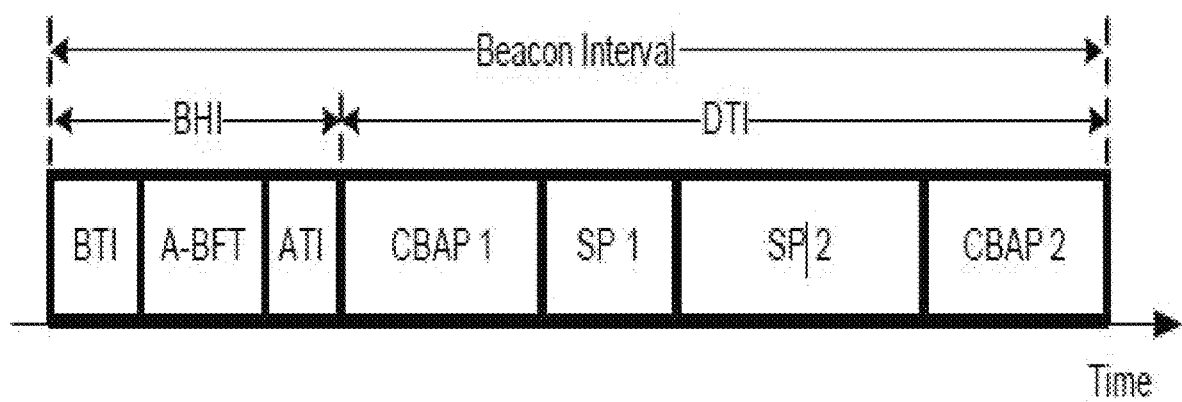
FIG. 2 illustrates an example of a beacon interval for an IEEE® 802.11 wireless communication system.

An example of the time frame of the beacon interval is illustrated in FIG. 2. The example corresponds to that specified in the IEEE® 802.11ad standards.

A time frame/beacon interval is initialized by a Beacon Transmit Interval (BTI) in which the PCP sends beacon frames to broadcast the presence and identity of the PBSS and indicate the values of a number of parameters such as the sector sweep configuration and the beacon interval. Broadcasting is achieved by transmitting multiple beacon frames using the different sectors of the steerable antenna of the PCP. The BTI interval is an optional time interval of the beacon message.

The next interval is referred to as the Association Beamforming Interval (A-BFT) and this provides signals for beam alignment for adaptive antennas. The interval is optional.

The next interval is the Announcement Transmission Interval (ATI). In this interval, resource request messages may be received from, and scheduling messages known as announcement management frames may be transmitted to, the STAs 103-107. The ATI is used to control the operation of the PBSS including specifically managing the allocation of the air interface resource. The ATI in particular includes scheduling data that informs the STAs of the allocation of resource in the current time frame.

The above mentioned three intervals are together known as the Beacon Header Interval (BHI). The PCP 101 transmits the BHI at repeating and periodic intervals thereby establishing the beacon intervals. Thus, in the example, a beacon interval is the time between subsequent transmissions of the BHI.

In addition to the BHI, the beacon interval further comprises a Data Transfer Interval (DTI) which is used for the actual communication of user data and the communication between the STAs 101-107. Thus, the DTI is a communication time interval in which time slots/intervals can be allocated to individual communications in the PBSS.

The DTI is (dynamically) divided into time intervals that are individually allocated to communications. There are two types of time intervals in a DTI. The first is known as a Contention Based Access Period (CBAP) which may be allocated to two of the STAs 101-107 that may both seek to communicate. In order to address conflicts between two STAs seeking to transmit at the same time, the system uses a Carrier Sense Multiple Access with Collision Avoidance (CSMA/CA) access mechanism.

The other type of data transfer interval is known as a Service Period (SP)). An SP is by the PCP 101 allocated for the transmission of only one specific STA, i.e. each SP is allocated to one and only one transmitting STA.

A beacon interval is accordingly in the example divided into a BHI in which the PCP transmits and a DTI in which the STAs (including possibly the PCP which is also an STA) transmit. The DTI will typically comprise a plurality of CBAPs and or SPs in order to serve the communication needs of multiple STAs in each beacon interval. In the example of FIG. 2, the DTI is divided into two CBAPs and two SPs.

The beacon interval can accordingly in this example be considered to be the time interval from one transmission of a BHI to the next. Conventionally, the beacon interval is periodic and the transmissions of the BHI are periodic with a fixed interval (specifically the start of the transmissions are periodic as the duration of the BHI may vary. The duration of a beacon interval is nominally 100 msec but can be set (fixedly) to any value between 1 msec and 65336 msec.

In the PBSS of FIG. 1, the PCP 101 is responsible for establishing an air interface time frame in the form of beacon intervals by transmitting at least part of the BHI for the BSS. It is also responsible for the allocation of the CBAPs and SPs and must accordingly establish a scheduling function for determining how the DTI should be used. In order to do so, the STAs 103-107 transmit resource requests to the PCP 101 which, based on a given scheduling algorithm and criteria, seeks to allocate CBAPs and SPs such that the requests can best be accommodated.

In order to be able to transmit resource requests to the PCP 101 and to receive resource allocations and synchronize communications, it is necessary for all STAs in a PBSS to be within range of the PCP 101. However, it is not necessary for all STAs to be within range of each other.

Figure 3:
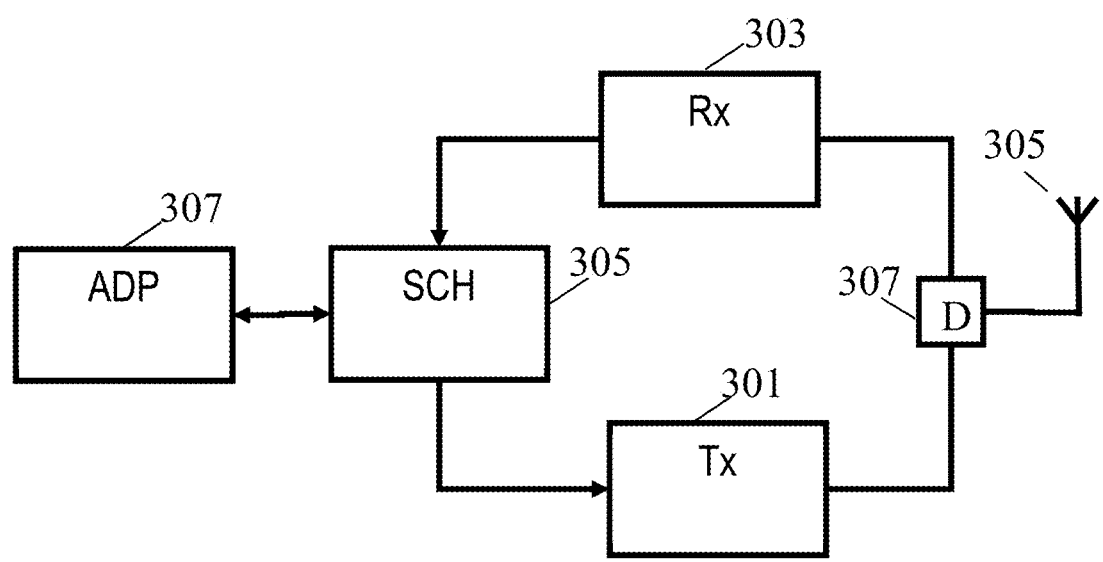
FIG. 3 illustrates an example of elements of a wireless communication apparatus in accordance with some embodiments of the invention.

FIG. 3 illustrates an example of some elements of the PCP 101. The PCP 101 includes a transmitter 301 for transmitting to the STAs 103-107 and a receiver 303 for receiving signals from the STAs 103-107 of the PBSS. The transmitter 301 and receiver 303 are coupled to the same antenna system 305 (which may e.g. be a single antenna or multiple antennas e.g. allowing for beamforming) via a duplexer 307 as will be familiar to the skilled person. For TDD, the duplexer 307 may specifically be a switch. It will also be appreciated that in some embodiments separate transmit and receive antennas may be used and thus no duplexer will be necessary.

The PCP 101 further comprises a scheduler 305 which is coupled to both the receiver 303 and the transmitter 301 and which is arranged to schedule the air interface resource in the PBSS by allocating time intervals to STAs 101-107 of the PBSS.

Specifically, the receiver 301 is arranged to receive resource requests from the plurality of STAs 103-107. The resource requests may directly or indirectly indicate an amount of resource that is requested. For example, the resource requests may indicate an amount of buffered data, a data rate request etc. Thus, the resource requests may indicate an amount of data which is pending scheduling for communication (and thus which is requested to be scheduled).

The received resource requests are forwarded to the scheduler 305 which is arranged to schedule air interface resource to communications between the STAs 101-107 by allocating time intervals in repeating scheduling intervals. The scheduler 305 may specifically define and allocate SPs to the STAs 101-107 allowing these to communicate directly with each other. In the system, SPs may be allocated to one STA for transmitting to a second STA. Communication in the reverse direction may be achieved by allocation of a second SP. In this way, a TDD (Time Division Duplex) approach is implemented.

It will be appreciated that different specific scheduling criteria, algorithms, and approaches may be used in different embodiments. Typically, the scheduling algorithms will seek to schedule air interface resource to achieve an efficient and fair sharing of the limited air interface resource.

The scheduler 305 is coupled to the transmitter 301 which is fed to the scheduling data for transmission to the STAs 103-107. The transmitter 301 then proceeds to generate a scheduling message providing indications of the scheduling that has been performed by the scheduler 305.

The transmitter 301 then proceeds to transmit the scheduling messages to the STAs 103-107 which then proceed to communicate in accordance with the received scheduling indications. Specifically, the individual STA 103-107 may proceed to receive and transmit (as appropriate) in the time intervals allocated to it.

The scheduling data defining the time intervals allocated to the different STAs 103-107 may specifically be transmitted in the ATI of the BHI, i.e. the ATI may be a scheduling message providing information of the scheduling performed by the scheduler 305.

The scheduling is performed in a repeating manner with each scheduling operation scheduling the air interface resource for a given communication time interval (e.g. a DTI). Scheduling messages are similarly repeatedly transmitted with each scheduling message providing scheduling information for a communication time interval after the time interval of the scheduling message but prior to the time interval of the following scheduling message.

In many embodiments, a scheduling operation may be performed for each beacon interval with the scheduling allocating time intervals (SPs/CBAPs) in the DTI of that beacon interval. The scheduling messages may be transmitted in the ATI section of the BHI.

Thus, the scheduling is performed repeatedly with each scheduling being for a given air interface communication time interval. On the air interface, the PCP 101 accordingly repeatedly transmits resource messages thereby defining repeating scheduling intervals.

A scheduling interval is the interval between two subsequent scheduling operations, and specifically is the interval between the transmission of two subsequent scheduling messages (and specifically with each scheduling message providing scheduling data for a time interval preceding the transmission of the subsequent scheduling message). The scheduling data is indicative of allocations of time intervals of the air interface communication time interval to the STAs 103-107.

It should be noted that the scheduling interval is not necessarily merely an indication of the operation (e.g. timing of) the scheduling operation of the scheduler 305 but relates to the actual transmissions/communications over the air interface. It may specifically be considered to be an interval between two subsequent resource allocation messages (with the interval typically including one of the resource message time intervals) However, typically this will also be closely and inherently linked to the operation of the scheduler 305 as each scheduling message will typically be preceded by the scheduler 305 performing a scheduling for the corresponding communication time interval, i.e. for the corresponding DTI.

In many embodiments, a scheduling interval may have the same duration as a beacon interval. Indeed, the PCP 101 may for each beacon interval perform a scheduling operation that allocates resource of the DTI of that beacon interval. The scheduling information may be sent in resource messages in the ATI of that beacon interval and the actual scheduling operation is typically started before the start of the beacon interval (and finished before the ATI in which the scheduling data is to be transmitted).

The PCP 101 of FIG. 3 further comprises an adapter 307 which is arranged to adapt the duration of one or more of the repeating scheduling intervals. The adapter 307 may dynamically vary the duration of the scheduling intervals, and indeed may set the duration of each scheduling interval independently of the duration of other scheduling intervals.

The adaptation of the durations of the scheduling intervals are performed in response to the resource requests that have been received. Specifically, the resource requests may be evaluated to determine current total requested (non-scheduled) resource and the adapter 307 may determine the duration of the next scheduling interval as a function of this amount.

For example, each of the STAs 103-107 may transmit a resource request to the PCP 101, e.g. during an ATI or attached to a data plane transmission to the PCP, indicating the amount of unscheduled data it has buffered awaiting transmission. It may further indicate how this is distributed with respect to the destination STA(s) 101-107. The amount of data may e.g. be represented by a current buffer level or e.g. directly as a number of bytes that is currently pending at the STA 103-107. Alternatively, the resource request can indicate the desired air time for transmissions to individual destination STAs.

When receiving the resource requests, these indications of the pending data may be forwarded from the receiver 301 to the scheduler 305 which may further forward it to the adapter 307. The adapter 307 (or in some embodiments, the scheduler 305) may combine/sum the individual indications to determine the total amount of data that is pending scheduling/transmission within the PBSS.

Based on this total value, the adapter 307 may proceed to determine a duration for the next scheduling interval. The duration is fed to the scheduler 305 and to the transmitter 301. The scheduler 305 will then determine the duration of the next DTI and then proceed to perform the scheduling of this DTI. The scheduling will further take the individual resource requests into account to determine a suitable scheduling and resource allocation for the DTI.

The scheduling data indicating the result of the scheduling is then fed to transmitter 301 together with an indication of the duration of the next scheduling interval and the transmitter 301 proceeds to transmit the scheduling message at the appropriate time. Specifically, it may proceed to transmit the scheduling message in the form of an Access Management Frame of an ATI in a BTI that is transmitted when the previous scheduling interval ends.

The adapter 307 is arranged to increase the duration for the resource requests being indicative of a higher combined resource being requested by the wireless stations. Indeed, in many embodiments, the duration of the scheduling interval may be a monotonically increasing function of the combined requested resource.

The combined requested resource may specifically be an indication of a total amount of data pending scheduling. This may be determined from the resource requests. For example, each resource request may include data indicating exactly how much data is pending transmission (and scheduling) for each STA 103-107 of the PBSS. The adapter 307 may simply add these together for all STAs 101-107 to determine the total amount of data currently pending scheduling. It may then select a predetermined duration e.g. in response to a predetermined monotonically increasing function or a table-look up. Indeed, in some embodiments, the duration may be set to the lowest value that will allow all currently pending data to be transmitted.

This duration is then used by the scheduler 305 and the transmitter 301 for the scheduling and for determining the timing of the next resource message being transmitted (i.e. the timing of the transmission of the resource message following the communication time interval for which the scheduler 305 currently performs the scheduling).

It will be appreciated that the specific algorithm used to determine the duration of the scheduling interval based on the received resource requests may depend on the preferences and requirements of the individual embodiment. Specifically, the exact function used to determine the duration based on e.g. the total data pending scheduling/transmission, may be different in different embodiments, and indeed may in some embodiments be dynamically variable.

In many embodiments, the duration may however be set to not fall below a minimum duration threshold and/or to not exceed a maximum duration threshold. This can ensure that the variation of the duration is relatively restricted and that operating conditions are kept in a range where efficient performance can be achieved without any specific disadvantage of different durations becoming too significant.

As an example, the duration may be determined as a given minimum duration for a pending data amount below a given minimum threshold, a given maximum duration for a pending data amount above a given maximum threshold, and with a linear function between the minimum and maximum thresholds. E.g., the duration is set to, say, 40 msec for a total amount of pending data being below, say, 2 Mbit, and to, say, 200 msec for a total amount of pending data being above, say, 20 Mbit. For pending data values between 2 Mbit and 20 Mbit, the duration is set linearly between 40 msec and 200 msec.

In some embodiments, the resource requests may specifically be in the form of a request for access to the channel for a given amount of time. Thus, rather than be based on data volume, the requests may be time based and directly request a certain duration of access to the channel. Such an approach may be easier in many embodiments as the PCP 101/ scheduler does not need to consider or know the current estimated data rate for the individual link. Rather, this may be known only at the requesting STA 103-107 which may use this information to determine the requested time resource.

In contrast to conventional approaches, the PCP 101 of FIG. 3 thus introduces a scheduling interval with a dynamically varying duration. The exact duration of a given scheduling interval may depend on the current amount of data pending scheduling. The Inventors have realized that such an approach may provide substantially improved performance in many systems, and especially for a PBSS such as that exemplified in FIG. 1. In particular, it may provide an improved and dynamically optimized trade-off between conflicting performance parameters such as efficiency and latency.

Indeed, the maximum latency under approximately constant data rate offered traffic conditions can often be considered to roughly be somewhere between the duration of one scheduling interval and the duration of two subsequent scheduling intervals. This can be realized by considering a request to transmit a packet which may be received by the PCP 101 just after the current scheduling operation has started. As a consequence, this data packet cannot be scheduled until the following scheduling interval, and thus even if it is scheduled to be transmitted at the beginning of the next scheduling interval, the latency will still inherently be higher than the duration of the current scheduling interval (and if it is scheduled last in the following scheduling interval it may be close to the sum of the durations of the current scheduling interval and of the subsequent scheduling interval). Therefore, in order to keep latency down, it is desirable for the durations of the scheduling intervals to be very short.

However, the shorter the scheduling interval is, the higher the proportion of the scheduling interval that is used to communicate control data, such as e.g. the BHI. Thus, the efficiency and throughput may be increased for increasing durations. Also, longer durations may allow larger time intervals to be allocated to specific STAs 103-107 and this may also increase efficiency. One reason for this is that longer frame transmissions have a reduced proportion of overhead from physical layer signalling, guard times and MAC headers.

The Inventors have realized that it is possible to address such conflicting desires by dynamically varying the durations of the scheduling intervals. This variation may specifically be such that it reflects the relative importance of the conflicting requirements, and specifically the changes in these depending on the current operating point. For example, if there is only a very small amount of data pending transmission, the efficiency may not be important as there may be sufficient resource to communicate both control data and user data. The duration may therefore be reduced e.g. to a level where it is still possible to transmit the small amount of data in the next scheduling interval but with there not being substantial unused resource in the scheduling interval (i.e. no unused time intervals). As the duration is short, the latency for new data to be transmitted in the next scheduling interval may be reduced substantially.

However, if there are large amounts of data to be transmitted, the adapter 307 may increase the duration resulting in larger communication time intervals (DTIs) within each scheduling interval thereby typically allowing a more efficient scheduling and also reducing the proportion of time spent transmitting control data. An overall increase in efficiency and throughput is achieved but at the potential cost of increased latency.

The effect of using an adaptive scheduling interval may specifically be that when there is lots of data queued, the scheduling interval is set equal to the maximum value (e.g. 2 ms). When there is little data the scheduling interval may be set just large enough to clear the buffers of pending data, so there is no wasted/idle time in the communication time interval, and any new data that arrives after running the scheduler can in principle be scheduled in the next scheduling interval which will start sooner. Running with short scheduling intervals gives lower latency but is less efficient because of the BHI overhead. As the loading increases the scheduling interval can be increased, thus improving the efficiency to match the throughput to the offered load. This matching may specifically enable that the system runs with the smallest scheduling interval duration that allows it to sustain the offered load, thus giving the lowest latency (within this requirement).

Figure 4:
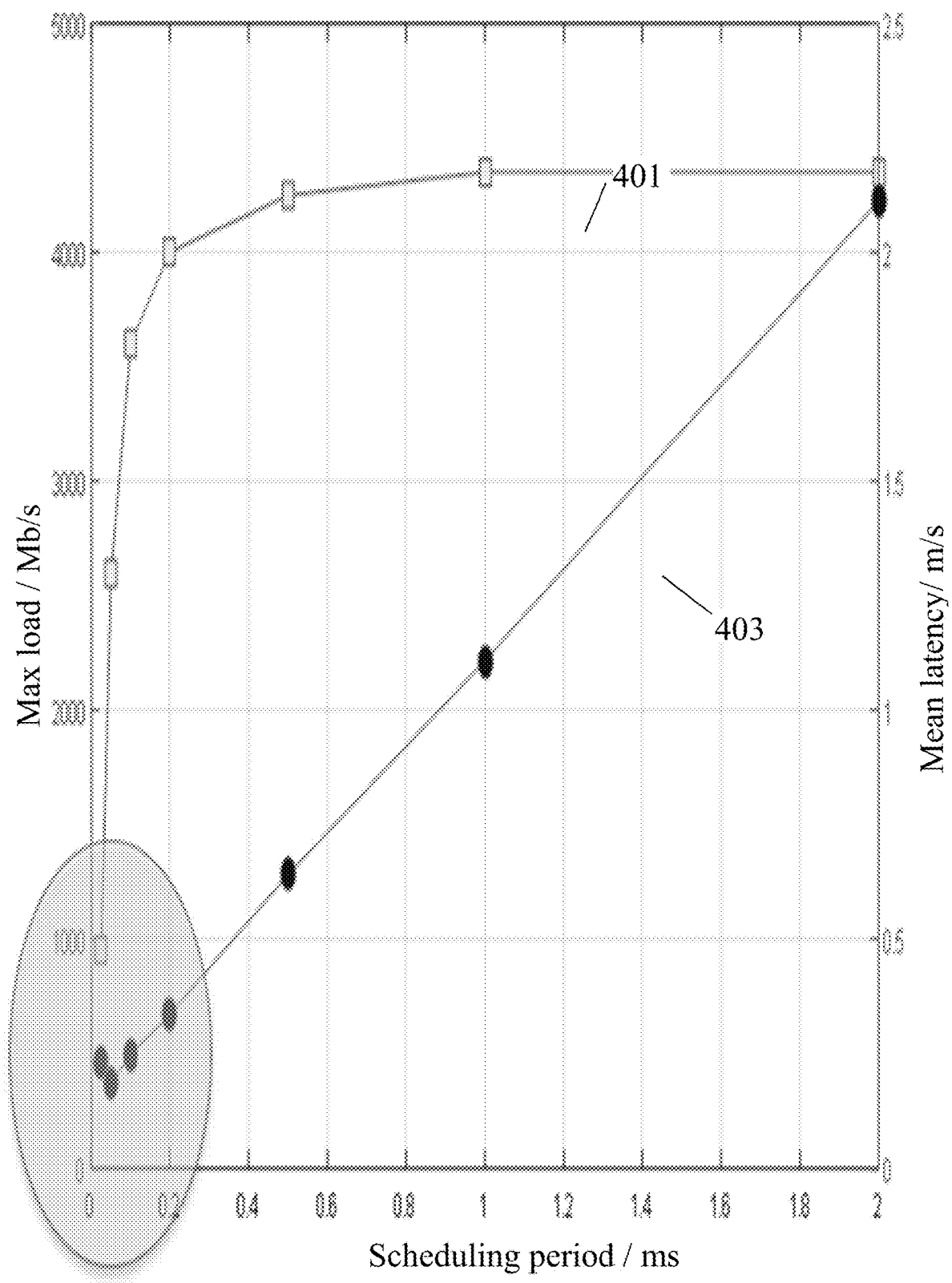
FIG. 4 illustrates a simulation result for a scheduling in accordance with some embodiments of the invention.

FIG. 4 illustrates simulation results for an IEEE® 802.11 ad PBSS. The figure illustrates the maximum load 401 and mean latency 403 as a function of the duration of the scheduling interval (the scheduling period). As can be seen, the adaptation of the duration of the scheduling interval allows a dynamic optimisation of the trade-off between the latency and capacity of the PBSS.

Figure 5:
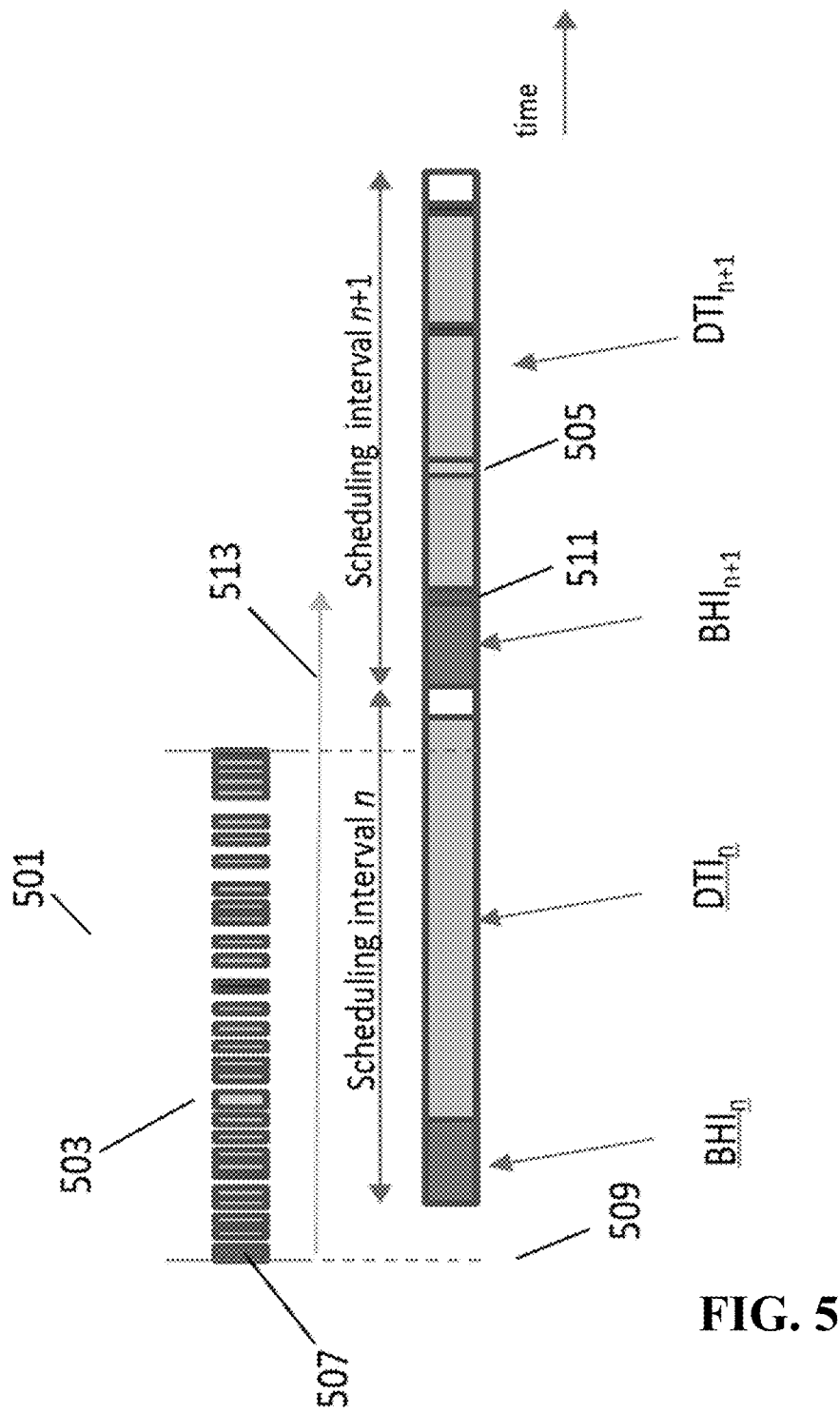
FIG. 5 illustrates an example of scheduling intervals for a wireless communication system in accordance with some embodiments of the invention.

The effect of the variable scheduling interval on the latency may be understood by considering FIG. 5 which illustrates an example of a scheduling. In the example, a number of data packets 501 need to be scheduled in a given scheduling interval n+1 (in the example of FIG. 5 a scheduling interval is equivalent to a beacon interval with the resource messages being transmitted as part of the BHI). Thus, as illustrated in FIG. 5, during scheduling interval n, resource requests have been received requesting resource for transmission of the data packets 501. The scheduler 305 then proceeds to schedule the data packets for communication in the next communication time interval, i.e. in $DTI_{n+1}$. For example, data packet 503 is scheduled for transmission at time 505 of $DTI_{n+1}$. This introduces a latency which is dependent on e.g. the total amount of pending data (as this may affect the time instant of $DTI_{n+1}$ at which the packet is scheduled) but also on the duration of the scheduling interval. Under near constant offered data rate to the link, with the rate at the maximum sustainable value without the data accumulating at the transmitter, all data queued at the point in which the scheduler executes is expected to be served and transmitted in the next beacon/scheduling interval. This may clearly be seen by considering packet 507 which may be a data packet that is just too late to be included in the scheduling for scheduling interval n. Thus, the cut-off time for beacon/scheduling interval n may be at time 509 and packet 507 is received immediately after and accordingly will be included in the scheduling for scheduling interval n+1. However, even if the packet 507 is scheduled as the first packet of $DTI_{n+1}$, and thus is transmitted at time 511, it will be subject to a delay corresponding to interval 513. This interval has a duration which is equal to the time difference between the cut-off time for the scheduling of interval n and the start of $DTI_n$ plus the duration of scheduling interval n. Thus, the duration of the scheduling interval provides a minimum possible delay, and the shorter the duration the lower the potential delay.

The approach of using a variable duration for the scheduling interval thus provides a dynamic optimization of the performance of the system in many embodiments and scenarios.

As previously mentioned, different scheduling strategies may be used in different embodiments. In the following a particularly advantageous scheduling algorithm will be described.

Figure 6:
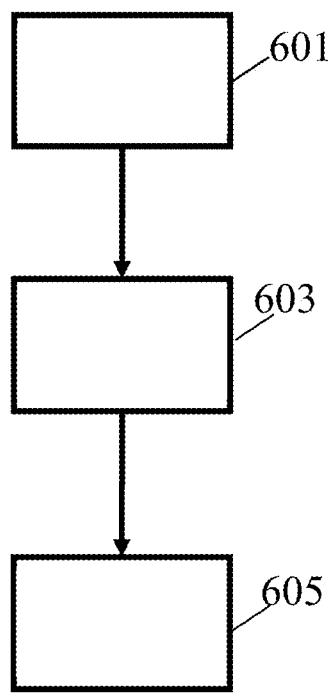
FIG. 6 illustrates an example of a method of scheduling in accordance with some embodiments of the invention.

In the scheduling approach the scheduler 305 performs a scheduling method as illustrated by the steps of the method illustrated in FIG. 6.

The approach starts in step 601 where scheduler 305 determines a set of communication links between pairs of the STAs 101-107 of the PBSS. In some embodiments, the set of links for which scheduling is performed may be determined as a number of currently active links, such as specifically including links for which resource have been requested. In other embodiments, the set of links may include all possible communication links in the PBSS, i.e. all possible pair permutations for the set of STAs 103-107 may be considered. Also, the communication links may be considered directional and thus a communication link from a first STA to a second STA is considered as a separate link to the communication link from the second STA to the first STA.

In some embodiments, the set of links may include a plurality of links for one pair of STAs (and for communication in the same direction). For example, different traffic classes may be defined for communications between STAs 103-107 and different links may be included in the set to account separately for different traffic classes.

The scheduler 305 may keep track of the communication requests and may schedule air interface such that it may be separately allocated to the links of the set. The links of the set of links may often (for the purpose of scheduling) be referred to as queues.

Thus, as a specific example, the scheduler 305 may determine the number of queues (per PCP) as:

$$N = \text{\#pairs} \times \text{\#directions} \times \text{\#traffic classes} + 1(\text{retx})$$

i.e. as the number of STA pairs times the directions of communication times the number of traffic classes plus one additional queue for data fragments to be retransmitted (referred to as retx in the above equation).

In the example of FIG. 1, the maximum number of queues (links in the set of links) is for two possible traffic classes accordingly:

$$N = 6 \times 2 \times 2 + 1 = 25.$$

The scheduler 305 then proceeds in step 603 in which it proceeds to determine a priority for each link in the set of links, i.e. for each queue. The priority of a given link/queue is based on a current estimated data rate for the link relative to an averaged previous achieved data rate for the link.

The current estimated data rate may reflect the data rate that is expected to be achieved on the communication link during the next communication time interval, i.e. during the time interval for which the current scheduling is performed. The current estimated data rate is accordingly indicative of the data rate that the data pending transmission on a communication link from a first STA 101-107 to a second STA 101-107 is assumed/estimated to be transmitted at if this is scheduled.

The averaged previously achieved data rate for a given link/queue represents the data rate that on average has been achieved in view of the previous scheduling. Thus, the averaged previously achieved data rate for a link may reflect the average data rate that has been achieved over a time period that includes time intervals not allocated to the link. Specifically, the averaged previously achieved data rate may be indicative of the effective data rate over a time period that includes at least one whole scheduling interval prior to (and typically immediately before) the scheduling interval for which the scheduling is performed.

The current estimated data rate may specifically be determined in response to messages from the STA 103-107. For example, the STAs 103-107 may report the current communication parameters/configuration (which is typically automatically adapted to the specific current channel conditions) and these may be used as an indication of the current estimated data rate. Specifically, in the system of FIG. 1, the STAs 103-107 may report the IEEE® 802.11 defined Modulation and Coding Scheme (MCS) index values which directly provide a data rate for the channel.

It should be noted that the averaged previously achieved data rate is dependent on the scheduling in previous scheduling intervals. Specifically, if a lot of time intervals/resource has been allocated to a first link, the averaged previously achieved data rate will tend to be high whereas if no or very little resource has been allocated to the first link, the averaged previously achieved data rate will be low. Thus, the averaged previously achieved data rate can be seen to be an indication of the previous resource prioritisation of the given link, i.e. it reflects how much resource has previously been allocated to it by the scheduling interval.

It will be appreciated that the exact time interval used for the averaging may be different in different embodiments, and indeed may even be dynamically adapted in some embodiments. It will also be appreciated that the averaging need not be a simple square window averaging but that any suitable low pass filtering effect may be used.

In many embodiments, the priority may be determined such that the priority increases for an increasing value of the current estimated data rate and decreases for an increasing value of the averaged previously achieved data rate. This approach may result in the scheduler providing an advantageous resource allocation in many embodiments. Specifically, it will tend to increase the priority of links for which the current data rate is higher as well as links which tend to not have had resource allocated recently. It may provide improved efficiency by tending to prefer communications that can be achieved at high data rate. At the same time, it may provide a fairer scheduling as this may be biased towards servicing STAs that have not been well served recently.

In some embodiments or scenarios, different data queues may have different priorities. Specifically, in many embodiments, the queue for retransmissions may be given the highest priority in order to minimise latency caused by retransmissions. Thus, in many embodiments, the retx queue may be scheduled with very high priority, and often before any other queue is scheduled.

As a specific example, the priority for a given link/queue may be determined according to:

$$priority_{ijk} = w_{ijk} \frac{(\text{link\_rate}_{ij})^\alpha}{(\overline{rate}_{ijk})^\beta}$$

where:
i is and index indicating the STA pair,
j is the direction of communication,
k is a traffic class,
$w_{ij}$ is a weight factor per link,
α and β are tunable parameters (both may be set equal to 1),
link_rate$_{ij}$ is the current estimated data rate for the link, and
$(\overline{rate}_{ijk})$ is the averaged previous achieved data rate by the link.

In the above equation, the link is thus indicated by the combined index ijk. Further, the value for the link_rate$_{ij}$ indicates that the data rate on the channel typically is independent of the traffic class (although in some embodiments this may also be dependent on the traffic class). In some embodiments, the weight factor may simply be set to a constant value.

Step 603 is followed by step 605 wherein the scheduler 305 schedules air interface resource to the plurality of wireless stations based on the determined priorities. Specifically, the scheduler 305 allocates one or more time intervals of the communication time interval to the links STAs 101-107. The scheduled time intervals are typically time intervals of the following communication time interval, such as SPs and CBAPs of the following DTI.

It will be appreciated that the exact algorithm used for scheduling as a function of priorities will depend on the preferences and requirements of the individual embodiment and that many different approaches can be used.

As a specific example, the scheduler 305 may first select the highest prioritized link. It may then determine the amount of data pending transmission for this link and based on the current estimated data rate calculate the required time required for transmission of the pending data. It may then allocate a corresponding time interval. Provided there is still remaining time in the communication time interval, the scheduler 305 may select the next highest prioritized link and repeat the operation. This approach can then be repeated until all available air resource for the current scheduling interval has been allocated, i.e. until the DTI has been fully allocated in the specific example.

Thus, in many embodiments, the scheduling may be in response to both the priorities and the amount of data pending transmission using the individual link.

In some embodiments, the determination of the priority for a given link may take various other properties or parameters into account. Such properties or parameters may specifically include:

The Traffic Class or Category for the Link.

For example, the sensitivity to latency and delays may depend on the specific type of data being transmitted. E.g. if it relates to real-time audio or video, it may be more sensitive than if it relates to non-real-time audio or video. Accordingly, the priority may be set higher for links if the data pending for that link relates to real time data than to non-real time data.

An Identity of at Least One of the STAs Involved in the Link.

For example, some STAs may be designated to be more important than others. For example, e.g. in a factory setup, one STA may be an alarm which may detect a potentially dangerous scenario whereas other STAs may be used to merely report standard operating measurements. In such a system, it may be much more important for the data from the alarm STA to be communicated with little latency and accordingly any link involving this STA may be prioritised higher.

A Traffic Identifier for the Link.

For example, a traffic identifier (TID) value can be assigned to a data flow. In IEEE® 802.11, for example, there are 16 possible TID values, eight identify TCs, and the other identify parameterised TSs.

A Traffic Stream for the Link.

For example, each individual data flow may be associated with a traffic stream (TS), with each TS having an associated traffic specification (TSPEC) which details characteristics and QoS expectations of the flow, such as mean data rate and burst size. Data flows with the same TS can be queued and handled together.

In many embodiments, the adjustment of the priority of these other features may be achieved by adjusting the weight factor in the above equation. The weight factor may in some embodiments be used to e.g. prioritize traffic on certain links in certain directions, and may indeed in some embodiments be dynamically adjusted.

In the specific approach, the factors $\alpha$ and $\beta$ are design parameters which can be adjusted to provide a desired scheduling operation and performance.

For example, setting both $\alpha$ and $\beta$ to 1 and having a constant weight factor, the scheduling will result in the mean rate achieved per queue being proportional to the link rate and with each link being allocated equal time to transmit. More generally, with equal weights (and equal link/air interface rates), the mean rates per queue will be equal (with loaded buffers). If $\alpha$ is 0 and $\beta$ is 1, then the mean rate depends on the weight values (and with equal weights the mean rates should be approximately equal given loaded buffers, thus providing 'fair rate' scheduling). If $\alpha$ is 1 and $\beta$ is 0, then the queues with the highest link rates are prioritized. Other queues may be starved if other mechanisms are not in place and there is sufficient traffic for the high priority queues. Thus, the performance can be adapted by adapting the design parameters $\alpha$ and $\beta$.

A specific example of the scheduling approach can be provided by considering a three member PBSS (and thus with three possible pairs of STAs), with two QoS classes, and two communication directions for each pair. In such an example, the set of links/priority list may include 12 entries.

As an example, the following list of priorities may be determined in step 603 (where {i,j,k} refer to {pair, direction, QoS class} and the buffer volume indicates the pending data for the individual queue/link):

| Queue | Priority | Buffer volume (kB) |
|---|---|---|
| {1, 1, 2} | 85.6 | 256 |
| {1, 2, 2} | 66.4 | 145 |
| {3, 1, 1} | 35.6 | 2990 |
| {2, 2, 2} | 34.7 | 0 |
| {1, 1, 1} | 30.2 | 235 |
| {3, 2, 1} | 29.7 | 12 |
| {1, 1, 2} | 26.5 | 0 |
| {2, 1, 1} | 25.5 | 0 |
| {2, 1, 2} | 24.3 | 14 |
| {2, 2, 1} | 19.9 | 256 |
| {3, 1, 2} | 15.0 | 147 |
| {3, 2, 2} | 7.8 | 99 |

In step 603, the scheduler 305 may then allocate time allocations to the links starting from the top. For example, a fixed time interval duration of, say, 20 μs may be used and referred to as a time chunk. If a selected link/queue has no data pending, it is skipped; if data is not sufficient to use the whole time chunk then a fraction of this time is assigned. If the scheduler reaches the bottom of the priority queue and there is still time available for allocation in the scheduling interval, then it can go back to the top of the priority queue and top up existing allocation(s).

Figure 7:
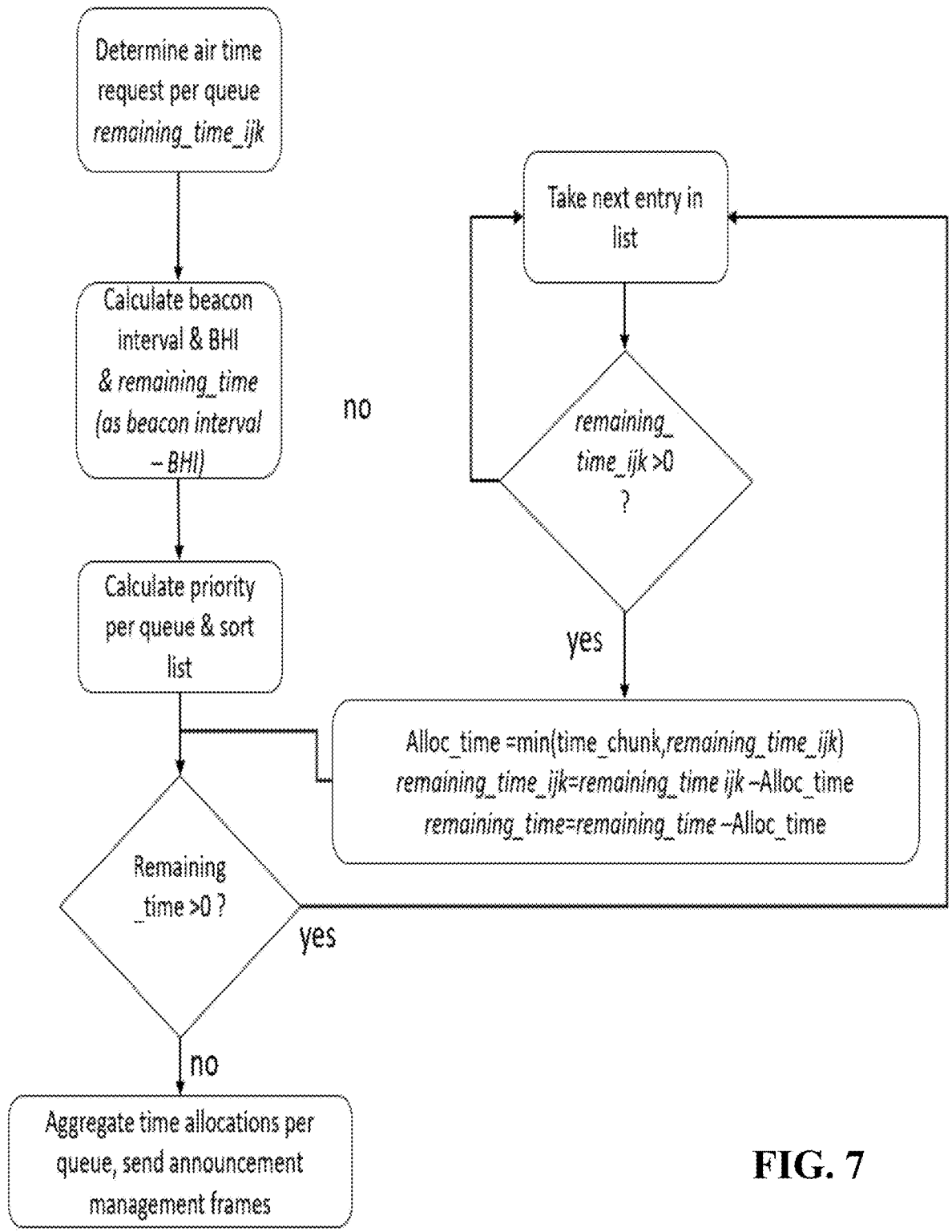
FIG. 7 illustrates an example of a method of scheduling in accordance with some embodiments of the invention.

A specific example of a possible scheduling approach is illustrated in FIG. 7.

In a conventional IEEE® 802.11 system, the beacon intervals are periodically repeating beacon intervals and the BHI comprising the ATI is periodically transmitted with one ATI being present for each beacon interval. Thus, in conventional systems, the duration of the beacon intervals is not only constant (the same in consecutive beacon intervals) but only one ATI exists in each beacon interval. Accordingly, a beacon interval corresponds to scheduling interval.

A beacon interval may specifically be the interval from the start or end of one beacon message to the start or end of the following one. A beacon message comprises system control information. The beacon message may provide data to the STAs 103-107 which they can use to adapt their communication within the beacon interval. The system control information may be different in different embodiments.

In many embodiments, the system control information may include a time frame reference. For example, the system control information may include an indication of a start instant of a time frame to which the STAs 103-107 may synchronize their operation. As other examples, the system control information may e.g. include a frame structure definition, such as e.g. defining the relative timing of different fields in the time frame.

In systems that use a grouping approach where wireless communication units are (typically dynamically) divided into groups of units sharing the common air interface resource being scheduled, some identification of the group may be included in the system control information.

For example, in many embodiments, the system control information may include information that provides an identity of the controlling wireless station. For example, the identity of the PCP 101 may be broadcast in the beacon messages.

Similarly, for cellular communication systems, the system control information may include a cell identification. For a wireless LAN, the system control information may include a BSS (Basic Service Set) identity.

In the specific example of an IEEE® 802.11 wireless system, the beacon message may correspond to one of the messages sent in the BHI, and specifically may be one of the control frames sent in a BTI, A-BFT or ATI.

In some embodiments of the current approach, this may still be the case, i.e. the scheduling intervals may directly correspond to the beacon intervals, and accordingly the duration of the beacon intervals is dynamically varied depending on the current resource request properties. Such an approach may be efficient in many embodiments and may allow a low complexity implementation. Indeed, a particular advantage is that no new time frame structures need to be implemented but rather the beacon interval may still consist in one BHI (which includes a single ATI) and one DTI. This may facilitate adaptation of the new approach of varying the duration of the scheduling interval.

As an example of such an approach, the adapter 307 may determine the duration of the beacon interval/scheduling interval as:

Beacon_int=min(max_beacon_interval,SUM(time_to_empty_queue_$ijk$)+BHI)

Beacon_interval=max(min_beacon_interval,beacon_int)

Thus, the beacon interval/scheduling interval is determined as the summation of the duration of the time to empty all queues (i.e. transmitting all pending data) plus the time to transmit the BHI subject to the duration being restricted to be between a minimum and maximum value.
Example Values:

min_beacon_interval=0.1 ms max_beacon_interval=2 ms

However, in many scenarios, it may be advantageous to have different durations for the beacon interval and for the scheduling interval. Specifically, in some embodiments it may be advantageous for some control information associated with the beacon interval to be transmitted with different intervals than the transmission of the resource allocation messages. In particular, it may be advantageous for some control data to be broadcast at periodic intervals whereas it may be advantageous for the resource messages and the scheduling interval to be freely adaptable and thus typically non-periodic.

Accordingly, in some embodiments, beacon intervals may be established by a repeated transmission of beacon messages where the beacon messages comprise e.g. control frames that may be sent in a BTI, A-BFT and ATI. In addition, there may be a separate transmission of scheduling messages establishing scheduling intervals. The timings of the beacon messages and the scheduling messages may be different, and thus the timings, and specifically durations, of the beacon intervals and the scheduling intervals may be different. Specifically, the beacon intervals/beacon messages may be periodic whereas the scheduling intervals/scheduling messages may be non-periodic.

For example, in the system of FIG. 1, the PCP 101 may periodically transmit a BHI comprising e.g. a BTI and an A-BFT but not (necessarily) an ATI. Thus, the periodic transmission of the BTI establishes a periodic beacon interval and thus may be used by the STAs 103-107 as appropriate. For example, the A-BFT may be used to adapt antenna array weights to perform beam forming/steering. The existence of such a periodic BHI may allow STAs to use existing functionality and approaches, and may provide increased compatibility with previous standards.

However, the ATIs may in the example be transmitted independently of the BHI and may in particular be transmitted at non-periodic and varying time intervals depending on the current load conditions. Thus, the transmission of the ATIs establish a scheduling interval time structure which is dynamically variable and which is independent of the BHI. This allows improved resource utilisation and reduced latency.

Figure 8:
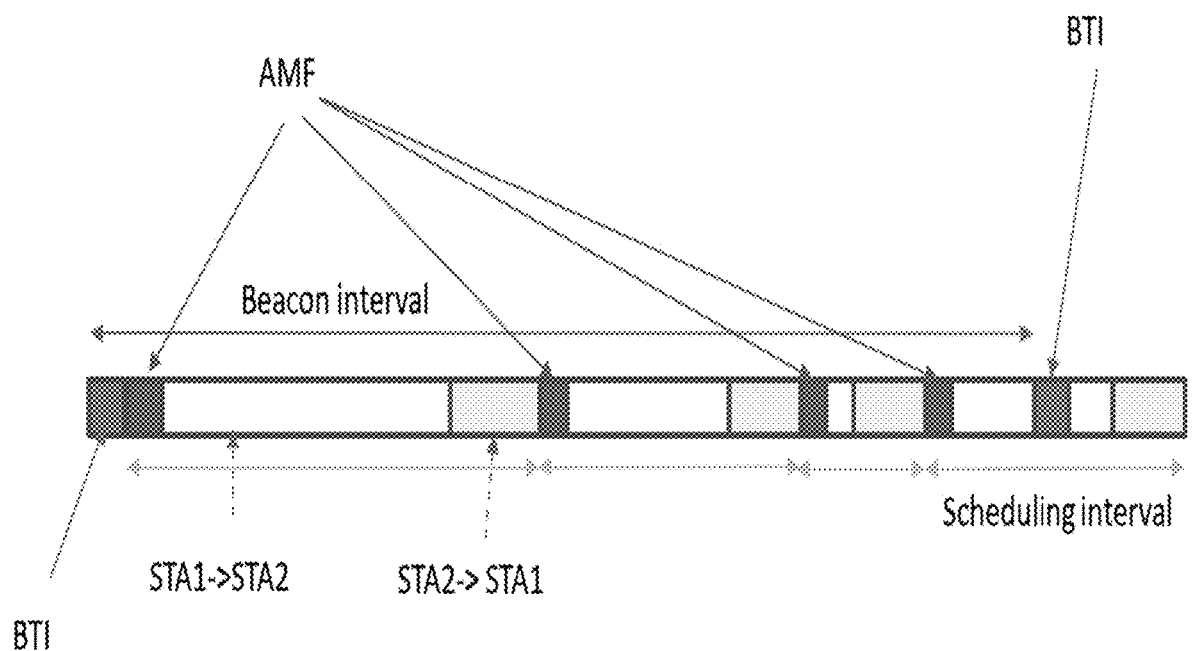
FIG. 8 illustrates an example of scheduling intervals and beacon intervals for a wireless communication system in accordance with some embodiments of the invention.

An example of such an approach is illustrated in FIG. 8. In this specific example a sequence is shown wherein the PCP 101 transmits BTIs at periodic intervals and Announcement Management Frames (AMFs) at adaptive intervals. The figure specifically shows two consecutive BTIs defining a beacon interval and four AMFs establishing different scheduling intervals. Thus, as illustrated by the example, AMFs may be transmitted with a BTI (as part of a BHI) or separately from the BTI (and BHI). As illustrated, multiple (or indeed no) AMFs (scheduling messages) may be inserted within a single beacon interval and at different (typically any) positions within the beacon interval. Equivalently, it may be seen that different numbers of BTIs may be inserted within a scheduling interval and typically in any position. FIG. 8 also reflects that the scheduling intervals will typically be shorter than the beacon intervals but it should be noted that it is in principle also possible for the scheduling interval to be longer than the beacon interval.

Typically, the beacon intervals are periodic and thus the specific timing of the beacon messages (such as the BTI) will typically be known at the STAs 103-107. However, as the scheduling intervals are varying, the timing of these may not be derivable independently by the STAs 103-107.

In some embodiments, the PCP 101 may transmit timing data to the STAs 103-107 indicating a timing of a subsequent (typically the next) scheduling message to the STAs 103-107. Specifically, the PCP 101 may include such timing data in the scheduling messages, and indeed scheduling messages transmitted by the PCP 101 may include a timing indication indicative of a timing of the following scheduling message. Such a timing indication may specifically be provided by the scheduling message comprising an indication of the duration of the current scheduling interval (i.e. of the scheduling interval for which the scheduling message provides information).

It will be appreciated that other options are possible, such as for example the inclusion of scheduling interval duration information in the beacon message. However, for implementations wherein the scheduling interval is typically smaller than the beacon interval, this will tend to restrict the freedom in adapting the duration of the scheduling intervals as these for at least some of the scheduling interval will need to be determined before the specific scheduling for that scheduling interval.

The previous description has focussed on embodiments compatible with an IEEE® 802.11 wireless local area network, and specifically with a PBSS of an IEEE® 802.11 ad wireless local area network. However, it will be appreciated that the invention is not limited to such communication system but may be used in many other wireless communication systems.

The project leading to this application has received funding from the European Union's Horizon 2020 research and innovation programme under grant agreement No 671551.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An apparatus for scheduling communications in a wireless communication system comprising a plurality of wireless stations operable to communicate wirelessly with each other in accordance with a time division multiple access scheme, the apparatus comprising:
   a receiver for receiving resource requests from the plurality of wireless stations;
   a scheduler for scheduling air interface resource to communications between the plurality wireless stations by allocating time intervals in repeating scheduling intervals;
   a transmitter for transmitting scheduling messages providing indications of the scheduling to the plurality of wireless stations;
   an adapter for adapting a duration of at least one scheduling interval of the repeating scheduling intervals in response to the resource requests from the plurality of wireless stations, the adapter being arranged to increase the duration for the resource requests being indicative of a higher combined resource being requested by the wireless stations; and
   wherein the adapter is arranged to adapt the duration based on at least one of a requirement that the duration does not exceed a maximum duration threshold and a requirement that the duration does not fall below a minimum duration threshold.

2. The apparatus of claim 1, wherein the scheduler is arranged to determine an indication of a total amount of data pending scheduling in response to the resource requests, and the adapter is arranged to adapt the duration in response to the total amount of pending data.

3. The apparatus of claim 1, wherein the scheduler is arranged to:
   determine a set of priorities including a priority for each link for a set of communication links between pairs of the plurality of wireless stations, the priority of a link being determined based on a current estimated data rate for the link relative to an averaged previous achieved data rate for the link; and
   schedule air interface resource to the plurality of wireless stations in response to the set of priorities.

4. The apparatus of claim 1, wherein the scheduler is arranged to further determine the priority for a link of a set of communication links between pairs of the plurality of wireless stations based on at least one of:
   a traffic class or category for the link;
   a traffic identifier for the link;
   a traffic stream for the link; and
   an identity of at least one wireless station of the link.

5. The apparatus of claim 1, wherein the transmitter is arranged to transmit beacon messages with repeating beacon time intervals, the transmit beacon messages comprising system control information.

6. The apparatus of claim 5, wherein the repeating beacon time intervals and the scheduling intervals have the same timings.

7. The apparatus of claim 5, wherein the repeating beacon time intervals and the scheduling intervals have different timings.

8. The apparatus of claim 5, wherein the transmitter is arranged to transmit the beacon messages periodically in non-periodic scheduling intervals.

9. The apparatus of claim 5, wherein the transmitter is arranged to transmit scheduling messages in all scheduling intervals and beacon messages in only a subset of the scheduling intervals.

10. The apparatus of claim 1, wherein the transmitter is arranged to transmit indications of a timing of a subsequent scheduling message to the wireless stations.

11. A method of scheduling communications in a wireless communication system comprising a plurality of wireless stations operable to communicate wirelessly with each other in accordance with a time division multiple access scheme, the method comprising:

receiving resource requests from the plurality of wireless stations;

scheduling air interface resource to communications between the plurality of wireless stations by allocating time intervals in repeating scheduling intervals;

transmitting scheduling messages providing indications of the scheduling to the plurality of wireless stations;

adapting a duration of at least one scheduling interval of the repeating scheduling intervals in response to the resource requests from the plurality of wireless stations, the adapting comprising increasing the duration for the resource requests being indicative of a higher combined resource being requested by the wireless stations where the duration is adapted based on at least one of a requirement that the duration does not exceed a maximum duration threshold and a requirement that the duration does not fall below a minimum duration threshold.

12. The method of claim 11, further comprising determining an indication of a total amount of data pending scheduling in response to the resource requests, and adapting the duration in response to the total amount of pending data.

13. The method of claim 11, further comprising:

determining a set of priorities including a priority for each link for a set of communication links between pairs of the plurality of wireless stations, the priority of a link being determined based on a current estimated data rate for the link relative to an averaged previous achieved data rate for the link; and scheduling air interface resource to the plurality of wireless stations in response to the set of priorities.

14. The method of claim 11, further comprising determining the priority for a link of a set of communication links between pairs of the plurality of wireless stations based on at least one of:

a traffic class or category for the link;

a traffic identifier for the link;

a traffic stream for the link; and an identity of at least one wireless station of the link.

15. The method of claim 11, further comprising transmitting beacon messages with repeating beacon time intervals, the transmit beacon messages comprising system control information.

16. The method of claim 15, wherein the repeating beacon time intervals and the scheduling intervals have the same timings.

17. The apparatus of claim 11, wherein further comprising transmitting indications of a timing of a subsequent scheduling message to the wireless stations.

18. A wireless communication system comprising a plurality of wireless stations operable to communicate wirelessly with each other in accordance with a time division multiple access scheme, the wireless communication system further comprising apparatus for scheduling communications, the apparatus comprising:

a receiver for receiving resource requests from the plurality of wireless stations;

a scheduler for scheduling air interface resource to communications between the plurality wireless stations by allocating time intervals in repeating scheduling intervals;

a transmitter for transmitting scheduling messages providing indications of the scheduling to the plurality of wireless stations;

an adapter for adapting a duration of at least one scheduling interval of the repeating scheduling intervals in response to the resource requests from the plurality of wireless stations, the adapter being arranged to increase the duration for the resource requests being indicative of a higher combined resource being requested by the wireless stations; and wherein the adapter is arranged to adapt the duration based on at least one of a requirement that the duration does not exceed a maximum duration threshold and a requirement that the duration does not fall below a minimum duration threshold.

\* \* \* \* \*